United States Patent
Andersen et al.

(10) Patent No.: US 6,802,688 B1
(45) Date of Patent: Oct. 12, 2004

(54) APPARATUS FOR HANDLING LAYERS OF PALLETIZED GOODS

(75) Inventors: John Sjælland Andersen, Svenstrup J (DK); Torben Christensen, Arden (DK)

(73) Assignee: Univeyor A/S, Arden (DK)

(*) Notice: Subject to any disclaimer, the term of this patent is extended or adjusted under 35 U.S.C. 154(b) by 0 days.

(21) Appl. No.: 09/959,511

(22) PCT Filed: Apr. 27, 2000

(86) PCT No.: PCT/DK00/00212

§ 371 (c)(1),
(2), (4) Date: Oct. 29, 2001

(87) PCT Pub. No.: WO00/64790

PCT Pub. Date: Nov. 2, 2000

(30) Foreign Application Priority Data

Apr. 27, 1999 (DK) .......................... 1999 00580

(51) Int. Cl.⁷ .............................................. B65G 59/04
(52) U.S. Cl. .................... 414/796.2; 294/64.1; 294/65; 414/797
(58) Field of Search .................. 294/64.1, 65; 414/626, 414/627, 796.2, 797

(56) References Cited

U.S. PATENT DOCUMENTS

| | | | |
|---|---|---|---|
| 2,716,497 A | * 8/1955 | Wahl et al. ........... | 414/796.2 X |
| 3,229,953 A | 1/1966 | Muir, Jr. ...................... | 248/363 |
| 3,387,718 A | * 6/1968 | Roth et al. ........... | 414/796.2 X |
| 3,406,938 A | 10/1968 | Muir, Jr. ...................... | 248/363 |
| 3,523,707 A | * 8/1970 | Roth ........................... | 294/65 |
| 3,598,439 A | 8/1971 | Dahlquist et al. ............. | 294/65 |
| 3,698,423 A | 10/1972 | Dahlquist et al. ........ | 137/454.2 |
| 3,698,755 A | * 10/1972 | Sinclair ........................ | 294/65 |
| 3,836,018 A | * 9/1974 | Dawson et al. ........... | 414/790.9 |
| 3,917,082 A | * 11/1975 | Howard et al. ....... | 414/796.2 X |
| 4,185,814 A | * 1/1980 | Buchmann et al. .... | 294/64.1 X |
| 4,674,785 A | * 6/1987 | Riesenberg .................. | 294/65 |
| 5,024,575 A | * 6/1991 | Anderson ................. | 414/627 |
| 5,088,878 A | 2/1992 | Focke et al. ................ | 414/627 |
| 5,207,553 A | 5/1993 | Konagai ...................... | 414/737 |
| 5,273,613 A | 12/1993 | Sato et al. ................ | 156/406.2 |
| 5,813,713 A | * 9/1998 | Van Den Bergh ............ | 294/65 |

FOREIGN PATENT DOCUMENTS

| | | | |
|---|---|---|---|
| DE | 19702885 | 7/1998 | ........... B66C/13/48 |
| EP | 0351571 | 1/1990 | ........... B65G/47/91 |
| EP | 0471170 | 2/1992 | ........... B65G/61/00 |
| EP | 0550114 | 7/1993 | ........... B65G/47/91 |
| FR | 2025500 | 9/1970 | ........... B65G/65/00 |
| FR | 2184072 | 12/1973 | ........... B65G/47/91 |
| GB | 1164766 | 9/1969 | ............ B66C/1/02 |
| GB | 2115369 | 9/1983 | ........... B65G/57/02 |
| SE | 9601976 | 11/1997 | ............ B66C/1/02 |
| WO | 9530615 | 11/1995 | ........... B65G/47/91 |
| WO | 9745355 | 12/1997 | ............ B66C/1/02 |

\* cited by examiner

Primary Examiner—Janice L. Krizek
(74) Attorney, Agent, or Firm—Antonelli, Terry, Stout & Kraus, LLP (57) ABSTRACT

An apparatus for handling layers of palletized goods is described, comprising a vertically displaceable lift head with a mainly horizontal suction face which is substantially adjusted in size for a pallet, for example an EU pallet. The head has a large number of downward open suction chambers arranged for being moved downward against the upper side of an upper layer of individually or groupwise packed goods on a pallet. Individual valves are connected with a vacuum source preferably integrated in the lift head, with individual valves between the suction chambers and the vacuum source being ball valves with spherical valve bodies interacting with round valve openings with preferably spherical valve seats. The valve openings are arranged for being automatically actuated to shut off the ball valves if an associated suction chamber is not blocked downwardly by contacting the upper side of the goods at the uppermost pallet layer. The lift head along the outer sides of the suction face preferably comprises means for exerting an inwardly directed pressure on at least the lower part of the outer sides of the goods of the upper pallet layer. The invention by simple measures mechanizes layered destacking of individual goods from a pallet and subsequent reformation of new pallets with layers of individual goods.

20 Claims, 9 Drawing Sheets

APPARATUS FOR HANDLING LAYERS OF PALLETIZED GOODS

BACKGROUND OF THE INVENTION

1. Field of the Invention

The present invention concerns an apparatus for handling layers of palletized goods.

2. Description of the Prior Art

In order to make effective and inexpensive, and to simplify distribution of goods, most goods are sold on pallets, preferably the so-called EU pallets (800×1200 mm). A widespread need has developed to also dispatch orders comprising lesser amounts of goods in a correspondingly effective way. Statistically it appears that many orders for small shops actually consist of consignments of goods most often consisting of very few layers or maybe just a single layer of palletized goods.

Until now several attempts have been made to mechanize such a layer-wise subpartitioning of palletized goods of every kind without success, including goods packed in cardboard packings, goods in single bags or sacks, goods in bundled bag packings or even foil encased bottled goods on a carrying bottom of cardboard. It has been attempted to develop a mechanical system for destacking in layers of palletized goods and subsequent restacking the individually destacked layers using a new, composite pallet which may be handled in a correspondingly effective way in final distribution as the usual whole pallets.

U.S. Pat. Nos. 3,406,938 and 3,229,953 describe a lifting device and an item holder using relatively complicated lifting or holding faces which consist of a large number of lesser chambers that are open toward the lifting face and the holding face, respectively. For lifting or holding of for example plate shaped items with different outer shapes or sizes in the printing industry it is known to use lifting or holding faces with a differentiated vacuum chamber system that is with a number of uniform, but individually connected chambers, which by means of a valve system may be connected with one or more vacuum sources in such a way that sheets or plates with individual shapes or sizes may be lifted or held fast with one and the same lifting or holding face.

EP-A-550114 describes a lifting device for lifting odd size items. The lifting means comprise suction means connected to a large number of suction cups. Each suction cup has means arranged inside the cup for blocking the connection to the suction means, when the cup is not in contact with an item to be lifted.

SUMMARY OF THE INVENTION

The invention is a new and improved apparatus for handling layers of palletized goods and comprising a vertically displaceable lift head with a mainly horizontal suction face which is substantially adjusted in size for a pallet, for example an EU-pallet, and which consists of a large number of downwardly openly suction chambers arranged for being moved downward against the upper side of an upper layer of individually or groupwise packed goods on a pallet, and which via individual valves is connected with a vacuum source preferably integrated in the lift head. The apparatus is arranged for co-operating with a depalletizing system. The individual valves between the suction chambers and the vacuum source comprise ball valves with very light thin walled spherical valve bodies being confined in the suction chamber by means of side projections or by a suitable lower holding net interacting with upper round valve openings with downward preferably spherical valve seats and arranged for being shut off if the relevant suction chamber is not blocked downwards by contacting the upper side of the goods at the uppermost pallet layer. This apparatus makes possible by means of simple measures mechanizing destacking in layers of individual goods from a pallet and subsequent reformation of new pallets with layers of individual goods.

In accordance with the invention the lift head along the outer sides of the suction face comprises means for exerting an inwardly directed pressure on at least the lower part of the outer sides of the goods of the upper pallet layer. By means of simple measures there is hereby achieved a new and improved apparatus which makes possible to handle multiple different types of palletized goods in layers with great certainty.

Notably, by means of the apparatus according to the invention—where suction lift is combined with a squeezing (inwardly directed pressure) action—lifting of pallet layers of foil packed bottles is achieved with great certainty where otherwise a great possibility exists of false air gaps at lateral directions because bottle packings usually have upwardly decreasing cross-sections. It has even proved possible to lift a pallet layer where apertures appear in the layer, either because some packings have been removed from the layer, or because the cross-sectional shape or the size of the packing simply is not a multiple of the cross-dimensions of the pallet layer.

The apparatus according to the invention is suitably thus designed that the means for exerting an inward pressure constitute inflatable bags arranged at respective outer sides of the lift head within a pressure absorbing outer casing thereof.

With the purpose of ensuring a very simple and suitable construction, the apparatus according to the invention may advantageously be thus designed that between the vacuum source and the suction chambers there is an air distribution chamber which at a lower, preferably horizontal, wall plate is designed with a common shut-off valve of a circle of mutually separated valve openings arranged in the wall plate and of a valve plate rotatably suspended therein and designed with a corresponding circle of valve openings. The valve plate is arranged for activation by means of a pneumatic cylinder inserted between the wall plate and a radial arm of the valve plate.

The apparatus according to the invention may furthermore be suitably designed so that the means for exerting an inward pressure furthermore are arranged in a vertically adjustable way relative to the lift head, so that the active area which is squeezed with inward pressure may be adjusted according to the height of the actual goods in respective pallet layers.

The means for exerting inward pressure may be used in lifting pallet layers of relatively light, fragile goods, for example groupwise foil packed non-slanting plastic cups by means of an evenly distributed, less powerful suction. The apparatus according to the invention may advantageously be designed so that each of the suction chambers comprises arresting means arranged to prevent the valve balls abutting on the valve seats for shutting off the ball valves. In a simple way, the arresting means may be constituted by a common wire net extending through the respective suction chambers above the valve balls, and which may be moved downward for preventing abutment of the valve balls against the valve seats.

As mentioned, the vertically displaceable lift head preferably comprises the vacuum source which preferably is a powerful centrifugal fan with an axial inlet port being connected with the air distribution chamber. The apparatus according to the invention is arranged for being connected to a pressurized air source which, among other things is used for activating the rotatable valve plate and for inflating the bags which are emptied of air again by coupling to the suction side of the vacuum source. With the intention of also mechanizing the subsequent subpartitioning of a pallet layer, the apparatus according to the invention may thus advantageously be so designed that the depalletizing system comprises a support plate arranged for carrying a layer of palletized goods and for being displaced between a receiving position under the lift head and a delivery position beside the lift head, and a pushing device arranged for pushing a layer palletized goods from the support plate and further onto a conveyor for dividing the palletized goods.

Suitably, the apparatus according to the invention may be further designed so that the surface of the support plate is wholly or partially provided with a friction facing designed to retain possible intermediate cardboard when the pallet layer is pushed from the support plate to the conveyor for dividing the goods, and that the conveyor comprises means arranged for retaining possible intermediate cardboard for removal by retracting the support plate to the receiving position.

BRIEF DESCRIPTION OF THE DRAWINGS

The invention is explained in the following in connection with the drawing, on which:

FIG. 7 shows a view of the lift head of. FIG. 6 as seen from below;

DESCRIPTION OF PREFERRED EMBODIMENTS

Figure 1:
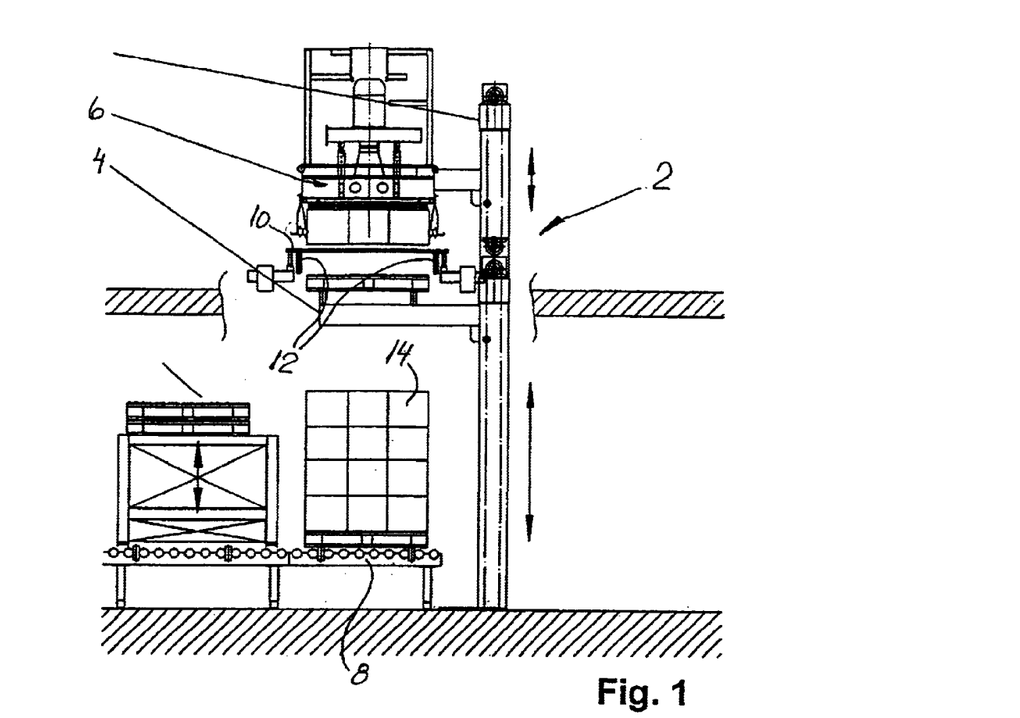
FIG. 1 shows a side view partly in section of an embodiment of an apparatus according to the invention.
Figure 2:
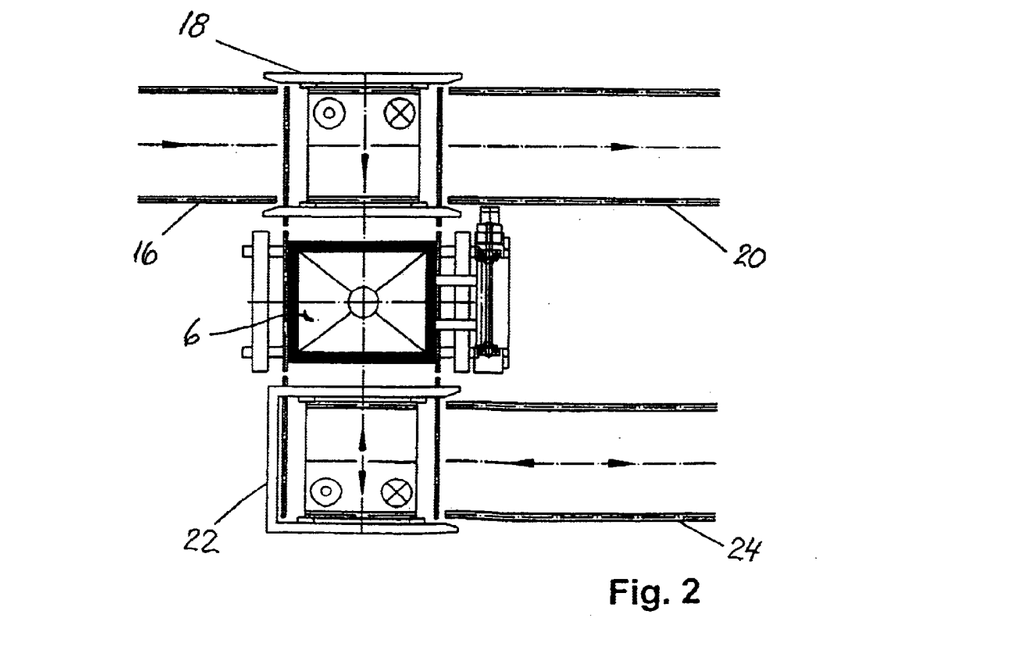
FIG. 2 shows a view from above of the palletizing system shown in FIG. 1.
Figure 3:
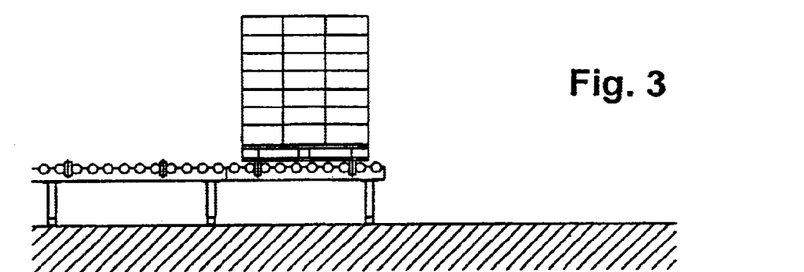
FIG. 3 shows a side view partly in section of a palletizing system comprising an embodiment of an apparatus according to the invention.

The palletizing system 2 shown in FIGS. 1–3 extends two stories high and comprises a pallet lifter 4 with an upper, vertically displaceable apparatus according to the invention with a lift head 6 arranged for destacking layers of goods from a filled pallet which by means of the pallet lifter 4 is taken from a roller conveyor 8 at the lowermost level. The palletizing system is arranged for destacking layers of goods which are transferred to special support plates 10 which as illustrated have lower, vertical foot rests 12. The support plates 10, which are larger than the pallets, are arranged for absorbing vertical loads between the single pallet layers, so that these may consist of relatively fragile goods. For destacking and inter-mediate handling of layers of more robust units of goods, a simple plane support plate may be used.

When, as shown in FIG. 1, handling of more regular, box-shaped items 14 is involved, which by themselves form self-supporting pallet layers, these items may easily be handled without use of special support plates with footrests in that such regular pallet layers may be restacked without any problems directly to a new pallet of mutually different goods. However, in that case a somewhat different palletizing system is required where the lift head 6 is suspended from a beam making possible displacing the lift head in the lateral direction, for example between two pallet lifters arranged side-by-side. At the lower left of FIG. 1 appears furthermore a pallet magazine for stacks of empty pallets.

At the top of FIG. 2 is shown a chain conveyor 16 for supplying filled support plates to a combined destacker and stacker 18 and a chain conveyor 20 for transporting filled support plates to an intermediate storage, while at the bottom of FIG. 2 there is shown a combined destacker and stacker 22 for empty support plates and a reversible chain conveyor 24 for supplying and removing stacks, each with six support plates, to and from intermediate storage. FIG. 3 shows a side view of details appearing at the top of FIG. 2.

The lift head 6, which is shown in more detail in FIGS. 4–7, comprises a vacuum source in the form of a powerful centrifugal fan 26, the central inlet port 28 of which is connected via a short tube piece 30 to a rectangular air distribution chamber 32 that via a special rotatable valve 34 (FIG. 8) is connected with a large number (23.×19=437) suction chambers 36 with a rectangular cross-section. The suction chambers 36 are open downwardly and in an upwards direction are connected with the front of the rotatable valve 34 via round valve openings with spherical edges in a downward direction or valve seats which to the outer spherical surface of very light, thin-walled, spherical valve bodies 38. In each suction chamber 36 there is confined a spherical valve body 38 by means of side projections or a suitable lower holding net which are not illustrated. The suction chamber 36 forms a rectangular lower suction face 40 fitting in cross-section to a standard pallet, for example, an EU pallet with dimensions of 800× 1200 mm across or a UK pallet with dimensions of 1000× 1200 mm across.

Figure 4:
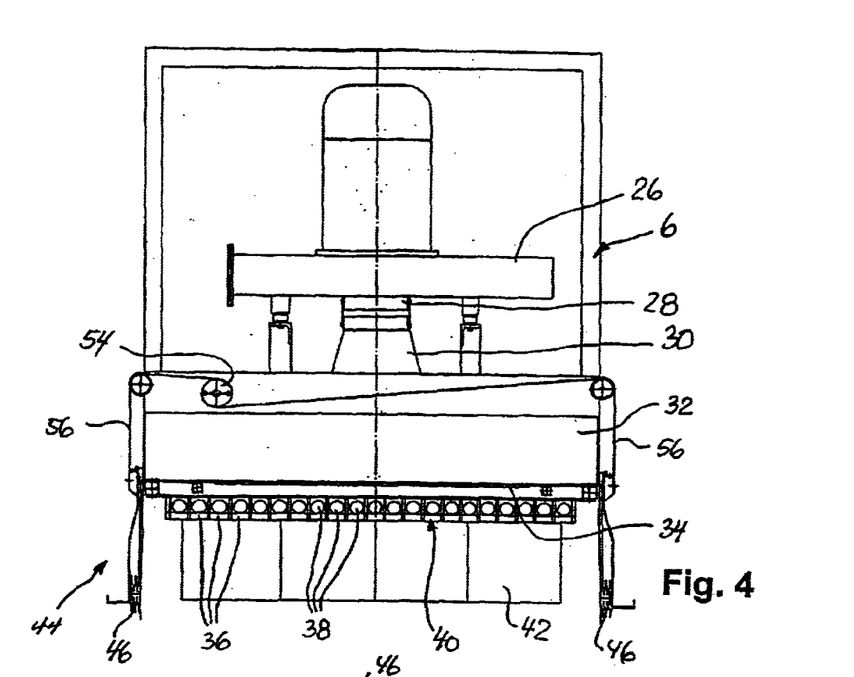
FIG. 4 shows a side view partly in section of an embodiment of a lift head for an apparatus for lifting in layers of palletized goods according to the invention as shown lowered over a pallet layer and with unactivated squeezing means.
Figure 5:
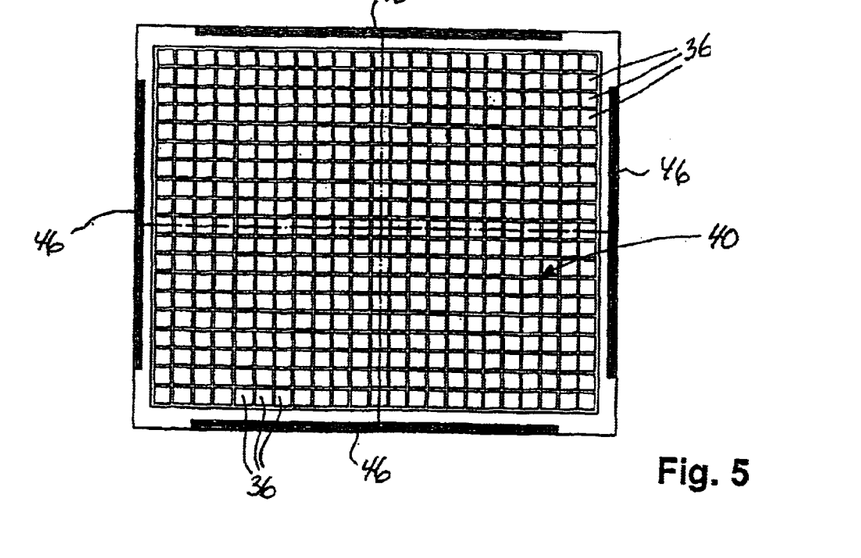
FIG. 5 shows a view of the lift head of FIG. 4, seen from below.
Figure 6:
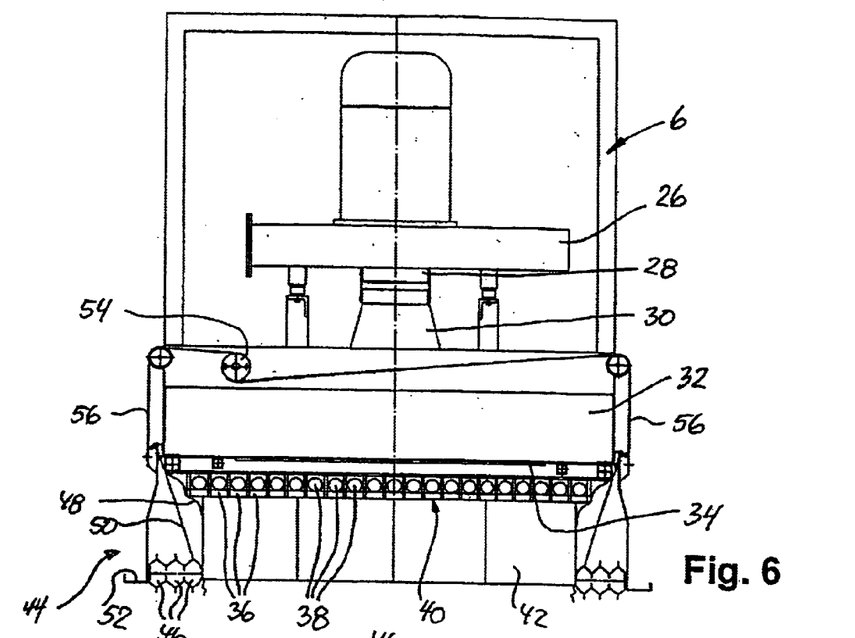
FIG. 6 shows a side view partly in section of the lift head shown in FIG. 4 for an apparatus according to the invention, shown lowered over a pallet layer of boxes and with an activated squeezing means.
Figure 7:
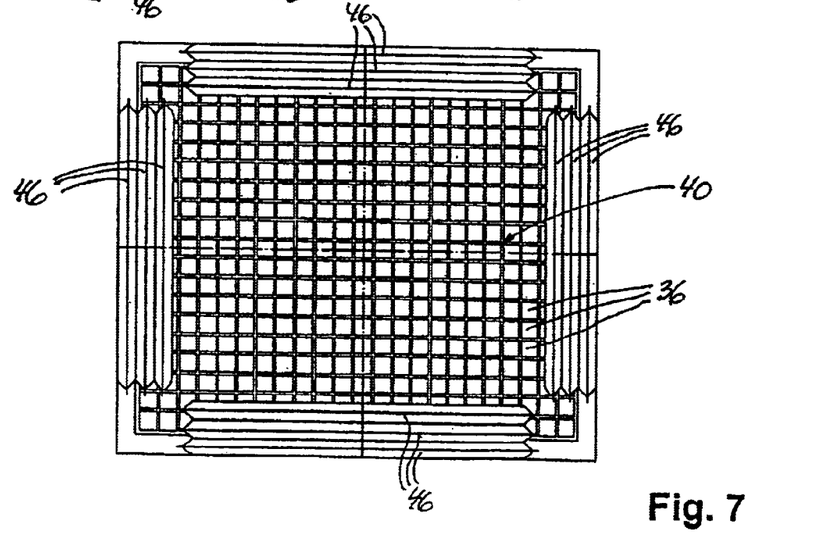

In FIG. 4, the lift head 6 is lowered around a pallet layer 42 of regular, box-shaped items in such a way that the suction face 40 just contacts the upper side of the pallet layer 42. This is surrounded by a special vertically adjustable, outer squeezing arrangement 44 which at each of the outer sides of the suction face comprises a number of inflatable bags 46 together with an inner skirt 48 and outer skirt 50.

The squeezing arrangement 44 which exerts inwardly directed pressure is surrounded by an outer skirt or a casing 52 arranged for absorbing the reaction pressure of the inflatable bags 46 which provide squeezing action when the bags are inflated and exerts an inwardly directed squeezing pressure on the outer sides of the pallet layer 42. Vertical adjustment of the squeezing arrangement 44, depending on the height of the actual goods in the pallet layer, occurs by means of preferably a motor driven winch 54 and lift slings 56 at each side of the lift head 6.

The inflatable bags 46 and possibly the cavity between the skirts 48 and 50 are inflated via control valves by means of pressurized air from a pressurized air source at a pressure of about 0.2 bar, so that the pallet layer 42 is squeezed by the inward pressure between the squeezing bags 46 simultaneously with the suction face 40 being activated by operating the rotatable valve 34. When the squeezing pressure is subsequently to be relieved, this takes place quickly by resetting the control valves and connecting the inflated bags to the suction side of the vacuum source with the centrifugal fan 26 delivering a vacuum of about 0.1 bar.

If the actual pallet layer to be lifted by means of the lift head 6 comprises relatively light and fragile packing items that do not stand up to lateral pressure, and which do not require very great suction pressure, the overall suction pressure may be lowered by forcibly controlling the spherical valve bodies in such a way that they are prevented from shutting off the valve openings. This may be achieved, for example, in a simple way by means of a common vertically adjustable wire net extending through the suction chambers and placed over the valve bodies so that these are hindered from blocking the valve openings to the vacuum source.

Figure 8:
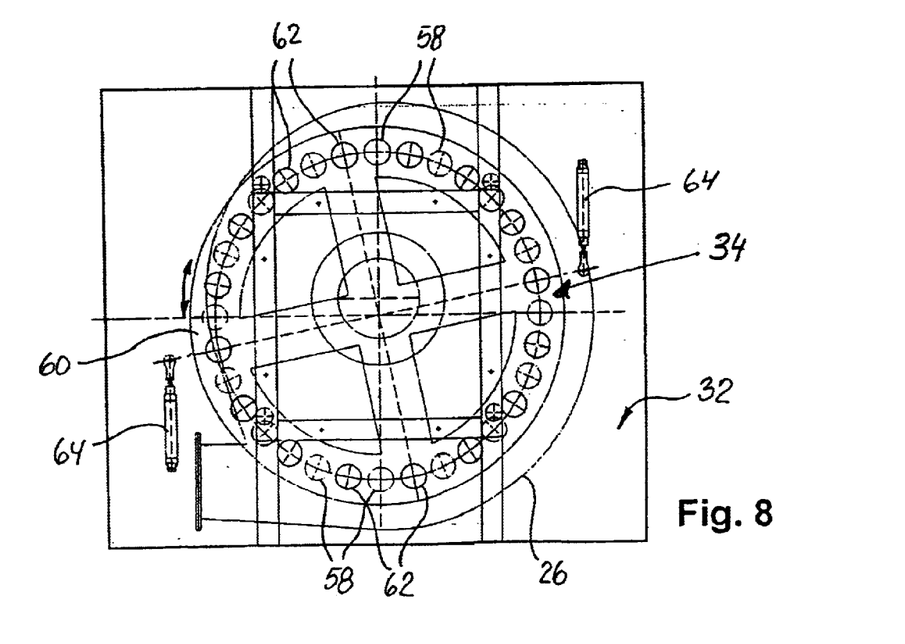
FIG. 8 shows a plan view of a preferred embodiment of a vacuum valve of the lift head shown in FIGS. 4 and 6 for an apparatus according to the invention.

The rotatable valve shown in FIG. 8 is a circle of mutually separated valve openings 58 arranged at the lower wall of the air distribution chamber 32 and of a valve plate 60, which is rotatable in relation thereto, with a corresponding circle of valve openings 62. The valve plate 60 is arranged for rotation for opening and closing the rotatable valve 34 by means of pressurized air cylinders 64 interacting with radial arms of the valve plates 60.

Figure 9:
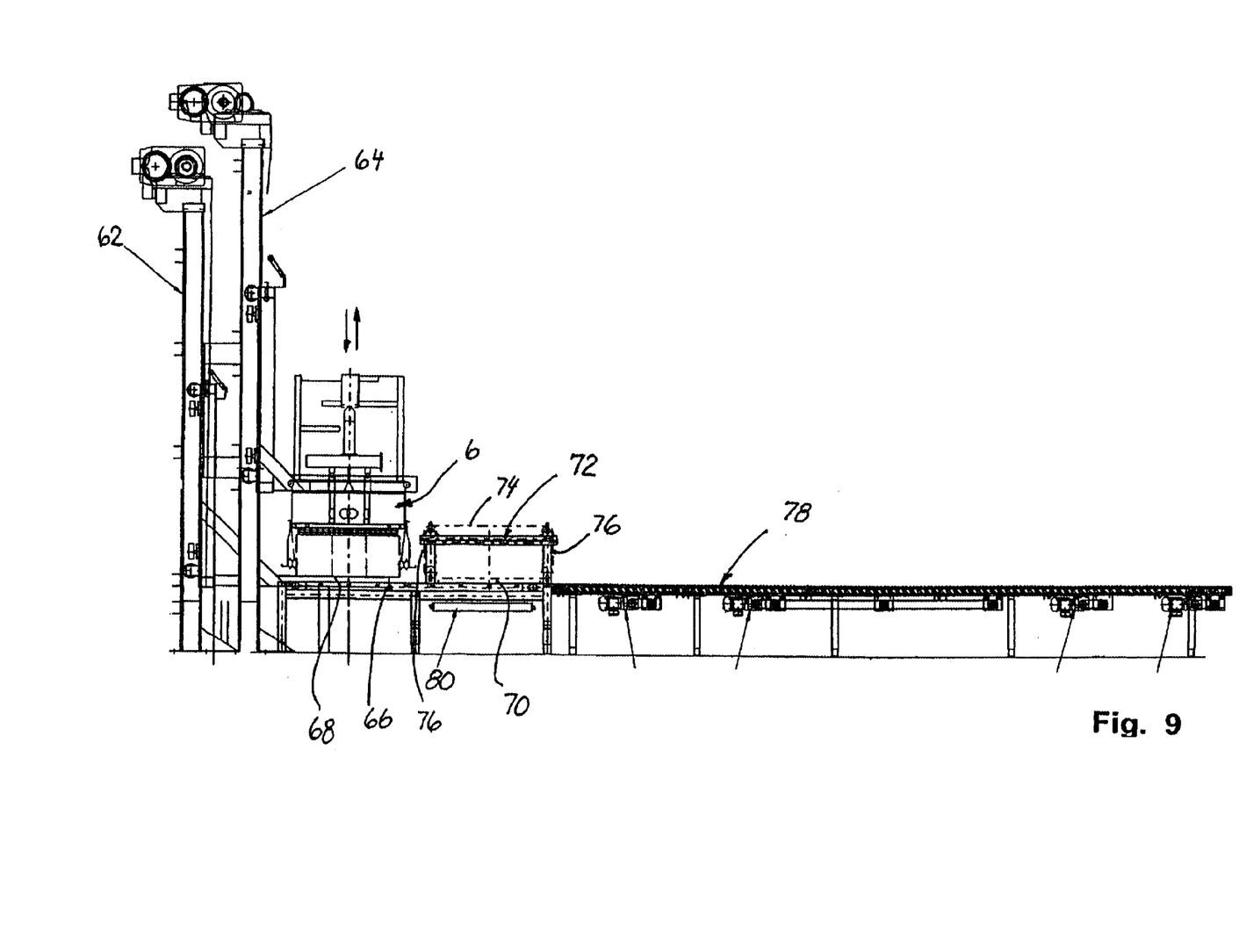
FIG. 9 shows a plan side view of depalletizing system comprising an apparatus according to the invention.
Figure 10:
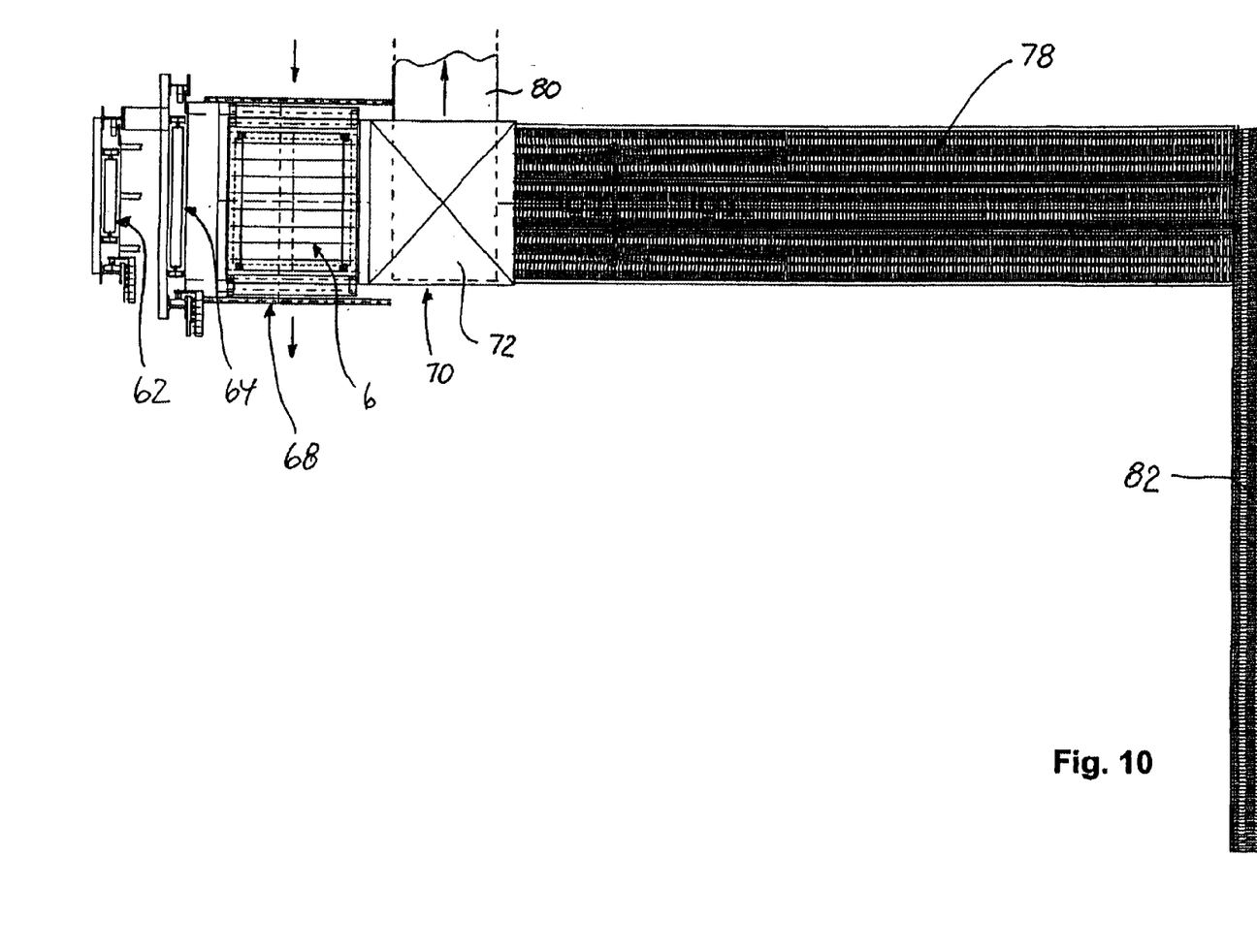
FIG. 10 shows a plan view from above of the depalletizing system shown in FIG. 9.
Figure 11:
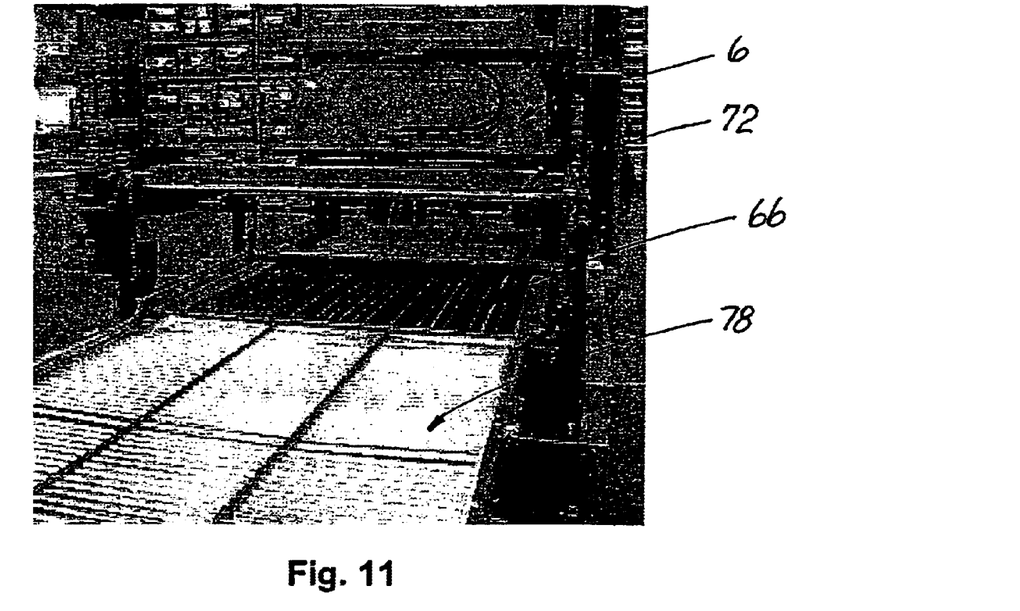
FIG. 11 shows a detailed view of the depalletizing system shown in FIGS. 9 and 10; where a filled pallet is placed in a starting position under the lift head.
Figure 12:
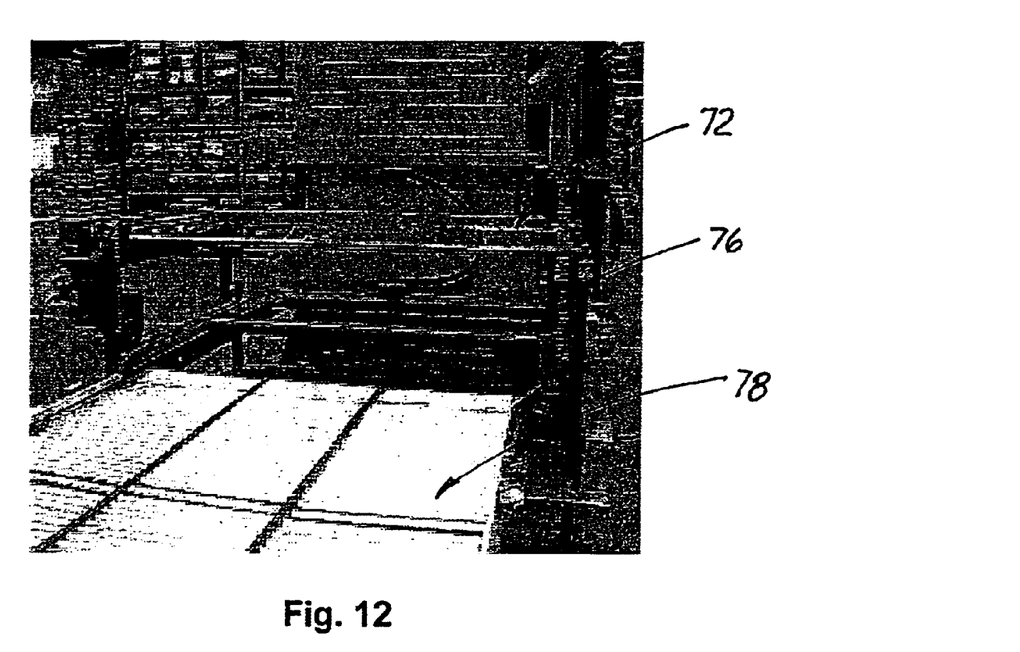
FIG. 12 shows a detailed view of the depalletizing system shown in FIGS. 9 and 10, where a pallet layer is lifted up and a support plate is moved in under the pallet layer.
Figure 13:
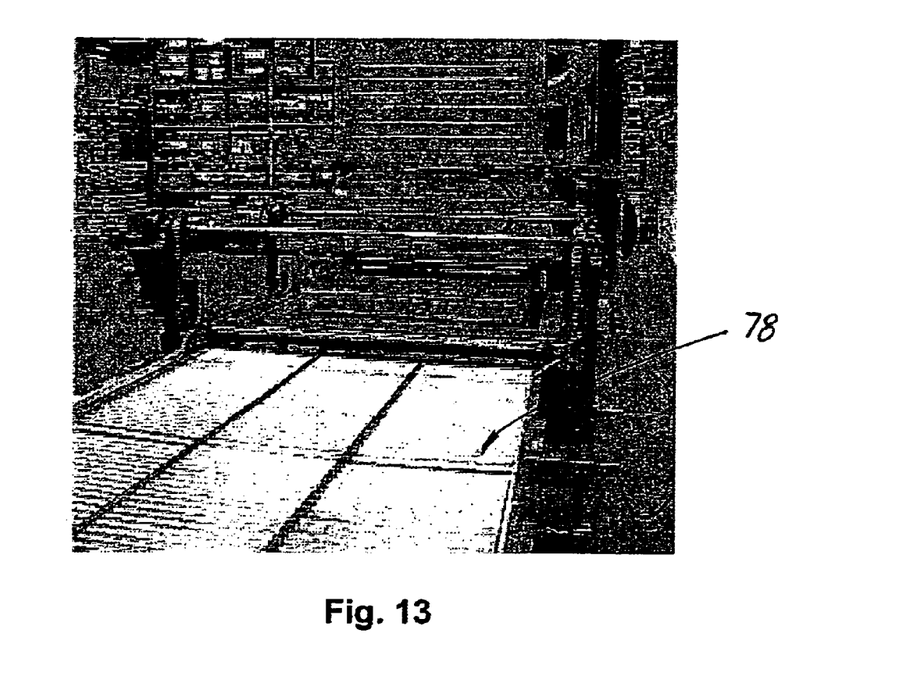
FIG. 13 shows a detailed view of the depalletizing system shown in FIGS. 9 and 10, where the pallet layer is lowered onto the support plate and moved out to pusher.
Figure 14:
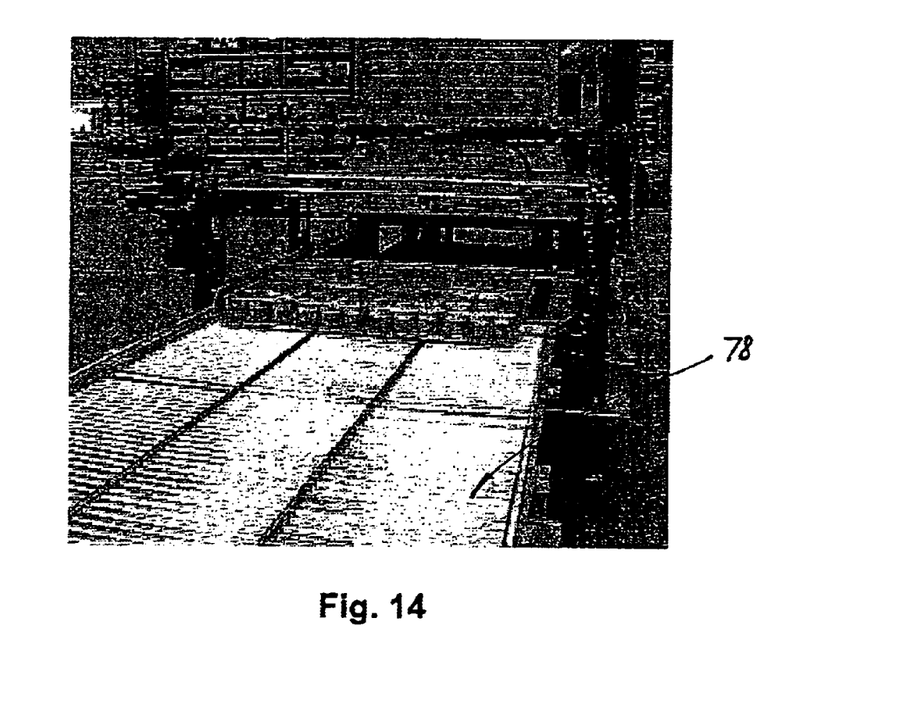
FIG. 14 shows a detailed view of the depalletizing system shown in FIGS. 9 and 10, where the pallet layer is pushed from the support plate out to a division conveyor.

The depalletizing system shown in FIGS. 9 and 10 comprises a stationary pallet lifter 62 co-operating with roller conveyors (not illustrated) for supplying and removing pallets and co-operating with a likewise stationary lifting arrangement 64 with a complete lift head 6. The depalletizing system comprises a support plate 66 (so-called stripper plate) arranged for being displaced between a receiving position 68 under the lift head 6 and a delivering position 70 at the side of the lift head 6, in that the support plate 66 is intended for receiving a pallet layer from the lift head 6 and displacing the pallet layer to the delivery position 70.

Figure 15:
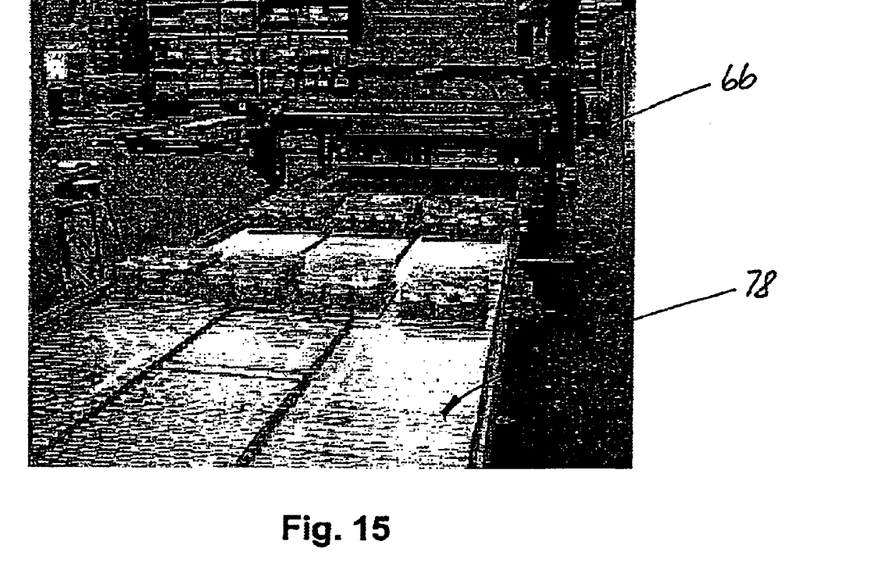
FIG. 15 shows a detailed view of the depalletizing system shown in FIGS. 9 and 10, where the single packings are moved away from each other on the division conveyor.
Figure 16:
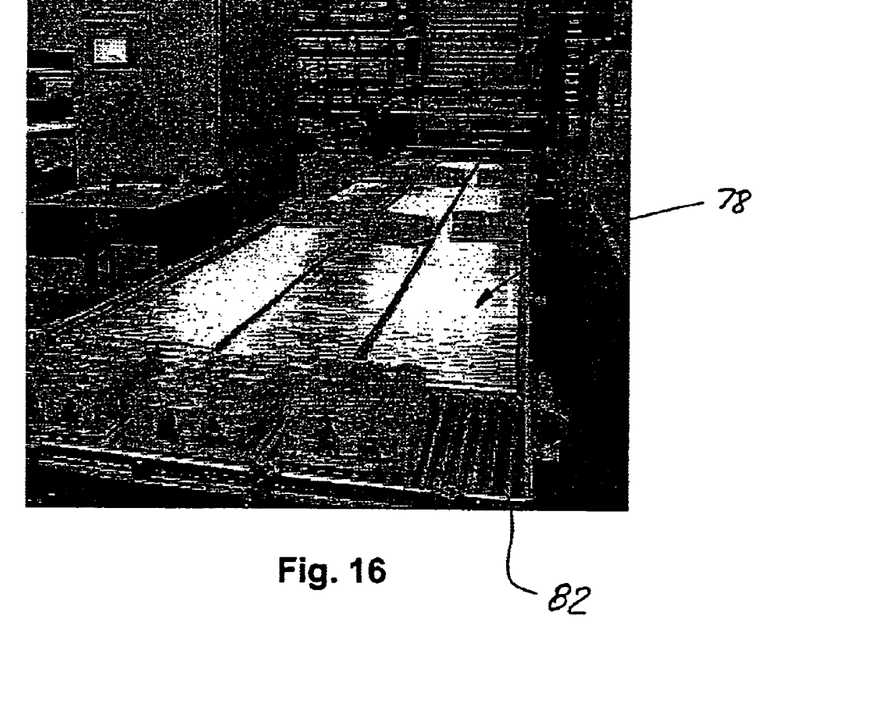
FIG. 16 shows a detailed view of the depalletizing system shown in FIGS. 9 and 10, where the single packings are transferred to transverse conveyor.

In the delivery position 70 there is furthermore mounted a pushing device 72, which between two endless chain conveyors 74, has two transverse beams 76. One of the beams 76 is arranged for pushing a pallet layer from the support plate 66 to a division conveyor 78, and the other of the beams is provided with fingers arranged for retaining a possible intermediate layer cardboard from the support plate 66 when this is displaced to the delivery position 68 so that the intermediate layer cardboard may be removed. In order to be able to retain the possible intermediate layer cardboard when the pallet layer is pushed from the support plate 66 to the division conveyor 78, the support plate 66 is designed or provided with a friction coating. Under the pushing device 72, there is a transversely running belt conveyor 80 intended for receiving and removing possible intermediate layer cardboard which is situated primarily between each of the pallet layers when there are "holes" in the pallet layer, for example due to irregularly shaped units of goods. As it most clearly appears from FIGS. 10, 15 and 16, the division conveyor 78 is arranged in such a way that the single units of goods are mutually separated both in lateral direction and in direction of transport as the division conveyor 78 furthermore is divided into sections with increasing transport speed so that the units of goods get sufficient mutual distance in the direction of transport for facilitating the transfer to a subsequent transverse conveyor 82.

What is claimed is:

1. An apparatus for handling layers of palletized goods comprising:

a vertically displaceable lift head including a suction face which is adjustable in size for contacting an upper layer containing at least one good of multiple layers of goods disposed on a pallet and downwardly opening suction chambers, which define the suction face, movable downwardly to contact an upper side of the upper layer of the at least one good disposed on the pallet;

valves disposed within the lift head between the suction chambers and a vacuum source, the valves including valve openings and balls with the valve openings not being shut off if an associated suction chamber is not blocked in a downward direction by contacting the upper side of the upper layer of the at least one good disposed on the pallet; and wherein the lift head along outer sides thereof includes means, responsive to pressurized air, for exerting an inwardly directed pressure on at least a lower part of outer sides of the at least one good of the upper layer to provide, in combination with any blocked suction chamber which is closed by an associated ball valve, a vacuum seal to promote lifting of the upper layer of the at least one good.

2. An apparatus according to claim 1, comprising:

a depalletizing system for removing the at least one good of the upper layer including a support plate for carrying a layer of palletized goods and being displaceable between a receiving position under the lift head and a delivery position beside the lift head and a pushing device for pushing the layer of palletized goods from the support plate and onto a conveyor for dividing the goods of the layer.

3. An apparatus according to claim 1, wherein:

the means for exerting an inwardly directed pressure is vertically adjustable relative to the lift head so that a surface area contacting at least the lower part of the outer sides of the at least one good of the upper layer is adjustable according to a height of the at least one good of the upper layer of at least one layer of goods disposed on the pallet.

4. An apparatus according to claim 3, comprising:

a depalletizing system for removing the at least one good of the upper layer including a support plate for carrying a layer of palletized goods and being displaceable between a receiving position under the lift head and a delivery position beside the lift head and a pushing device for pushing the layer of palletized goods from the support plate and onto a conveyor for dividing the goods of the layer.

5. An apparatus according to claim 1, wherein:

the valves comprise ball valves; and each of the suction chambers comprises means for preventing balls of the ball valves from contacting valve seats of the ball valves to shut off the ball valves.

6. An apparatus according to claim 5, comprising:

a depalletizing system for removing the at least one good of the upper layer including a support plate for carrying a layer of palletized goods and being displaceable between a receiving position under the lift head and a delivery position beside the lift head and a pushing device for pushing the layer of palletized goods from the support plate and onto a conveyor for dividing the goods of the layer.

7. An apparatus according to claim 5, wherein:

the means for preventing comprises a common wire net extending through the suction chambers above the balls which is movable downwardly for preventing contact of the balls against valve seats of the ball valves.

8. An apparatus according to claim 7, comprising:

a depalletizing system for removing the at least one good of the upper layer including a support plate for carrying a layer of palletized goods and being displaceable between a receiving position under the lift head and a delivery position beside the lift head and a pushing device for pushing the layer of palletized goods from the support plate and onto a conveyor for dividing the goods of the layer.

9. An apparatus according to claim 5 wherein:

the means for preventing comprises projections in the suction chambers for preventing contact of the balls against valve seats of the ball valves.

10. An apparatus according to claim 9, comprising:

a depalletizing system for removing the at least one good of the upper layer including a support plate for carrying a layer of palletized goods and being displaceable between a receiving position under the lift head and a delivery position beside the lift head and a pushing device for pushing the layer of palletized goods from the support plate and onto a conveyor for dividing the goods of the layer.

11. An apparatus according to claim 1, wherein:

the means for exerting an inwardly directed pressure comprises inflatable air bags disposed at outer sides of the lift head within a pressure absorbing outer casing thereof.

12. An apparatus according to claim 11, comprising:

a depalletizing system for removing the at least one good of the upper layer including a support plate for carrying a layer of palletized goods and being displaceable between a receiving position under the lift head and a delivery position beside the lift head and a pushing device for pushing the layer of palletized goods from the support plate and onto a conveyor for dividing the goods of the layer.

13. An apparatus according to claim 11, comprising:

an air distribution chamber located between the vacuum source and the suction chambers; and a common shut-off valve with a circle of mutually separated valve openings disposed in a wall plate cooperating with a rotatable valve plate therein with a circle of valve openings corresponding to the circle of the mutually separated valve openings; and wherein the valve plate is rotated by a pneumatic cylinder disposed between the wall plate and a radial arm of the valve plate.

14. An apparatus according to claim 13 wherein:

the common shut-off valve is disposed in a horizontal wall plate with the circle of mutually separated valve openings being disposed in the horizontal wall plate.

15. An apparatus according to claim 13, wherein:

the vacuum source comprises a centrifugal fan including an inlet port connected with the air distribution chamber.

16. An apparatus according to claim 15, comprising:

a depalletizing system for removing the at least one good of the upper layer including a support plate for carrying a layer of palletized goods and being displaceable between a receiving position under the lift head and a delivery position beside the lift head and a pushing device for pushing the layer of palletized goods from the support plate and onto a conveyor for dividing the goods of the layer.

17. An apparatus according to claim 13, comprising:

a pressurized air source for activating the rotatable valve plate and for inflating the air bags which are emptied of air by coupling the air bags to a suction side of the vacuum source.

18. An apparatus according to claim 17, comprising:

a depalletizing system for removing the at least one good of the upper layer including a support plate for carrying a layer of palletized goods and being displaceable between a receiving position under the lift head and a delivery position beside the lift head and a pushing device for pushing the layer of palletized goods from the support plate and onto a conveyor for dividing the goods of the layer.

19. An apparatus according to claim 13, comprising:

a depalletizing system for removing the at least one good of the upper layer including a support plate for carrying a layer of palletized goods and being displaceable between a receiving position under the lift head and a delivery position beside the lift head and a pushing device for pushing the layer of palletized goods from the support plate and onto a conveyor for dividing the goods of the layer.

20. An apparatus according to claim 19, wherein at least a part of a surface of the support plate is provided with a friction facing for retaining an intermediate cardboard when the layer of palletized goods is pushed from the support plate to the conveyor for dividing, and the conveyor for dividing comprises means for retaining the intermediate cardboard by retracting the support plate to the receiving position.

* * * * *